UNITED STATES PATENT OFFICE.

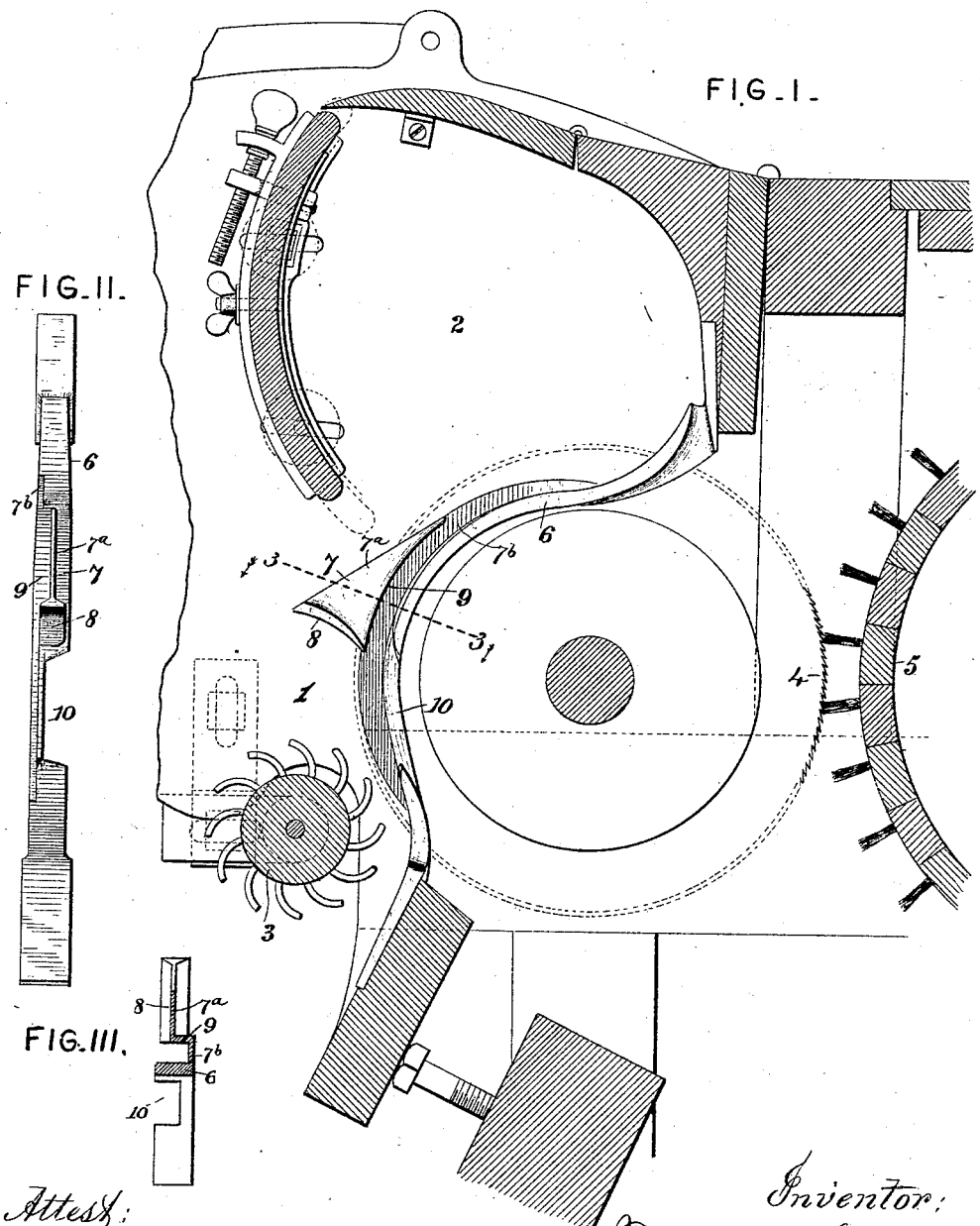

FERDINAND C. GAMMONS, OF BRIDGEWATER, MASSACHUSETTS, ASSIGNOR TO THE EAGLE COTTON GIN COMPANY, OF SAME PLACE.

COTTON-GIN.

SPECIFICATION forming part of Letters Patent No. 327,936, dated October 6, 1885.

Application filed May 11, 1885. Serial No. 165,145. (No model.)

*To all whom it may concern:*

Be it known that I, FERDINAND C. GAMMONS, a citizen of the United States, residing at Bridgewater, in the county of Plymouth and State of Massachusetts, have invented a new and useful Improvement in Cotton-Gins, of which the following is a specification.

My invention relates to that class of cotton gins known as the "eclipse hulling-gins," which serve the purpose of separating the hulls from the cotton as well as ginning it. An illustration of a machine of this type may be seen in Letters Patent No. 20,120, granted on the 27th of April, 1858, to Wilson and Payne.

In these gins as customarily constructed the ribs forming the breast of the gin are provided at approximately their mid-length with centrally-located longitudinal flanges, having flat sides between which the teeth of the saws pass in such a manner as to carry with them the seed-cotton without the hulls and trash. The passages between these flanges are necessarily made so narrow as to prevent the seed from going through them rapidly, and the consequence is that a large proportion of the seed passes over the outside of the flanges. A further difficulty with such gins is that the seed and hulls being discharged together, the seed is rendered unsalable.

My improvement consists in the provision of means for permitting a guiding-passage for the seed and its discharge separate from the hulls.

In order that the invention may be better understood, I will proceed to describe it with reference to the accompanying drawings, in which—

Figure I is a vertical sectional view of the hopper and saws and adjacent parts of a gin embracing my improved rib. Fig. II is a front elevation of a single rib. Fig. III is a transverse section of one of the ribs, taken on the line 3 3, Fig. I, and looking in the direction of the arrows.

1 is the hulling and 2 is the ginning-chamber, 3 the huller-cylinder, 4 the saws, and 5 the brush-cylinder, of a gin of any preferred construction.

6 represents one of the ribs forming the breast of a gin. Each rib is provided with a flange, 7, projecting beyond the saw-teeth, so that the saw will pass twice through portions of the breast, submitting the cotton to a double action for the purpose, first, of hulling it, and, second, of ginning it. As ordinarily constructed, the flange has perfectly flat parallel sides, and is joined at its base to the central part of the rib. Its lower extremity is provided with a lateral projection or enlargement, 8, of such size as to permit the seed cotton to pass between the flanges on the adjacent ribs. At the base of the flange 7 where it joins the rib, the lateral projection 8 is cut away, so as to allow space between it and the outer convex surface of the rib for the passage of the seed. It is found, however, that the space thus afforded is insufficient, and that a large part of the seed after being cleaned is discharged over the flanges and lateral projections 8 into the hulling-chamber. The object of my invention is to remedy this defect. To this end I form the flange 7 in two separate planes, the outer one, $7^a$, of which is joined to the inner one, $7^b$, by an offset or a shoulder, 9. Upon reference to Fig. III it will be seen that the offset 9 overhangs the rib 6, and thereby forms a groove or channel in which the seed travels. I also join the base of the flange to the edge, instead of the center of the rib, whereby the space which was formerly divided and located on opposite sides of the flange is merged into one, and a passage of double size thus formed on one side of the flange.

In order that the cleaned seed, on falling from the ginning-chamber may not be mingled and discharged with the hulls, I cut away the rib, as shown at 10, so that the seed on falling through the groove 9 will find a passage through such cut-away portion to the rear of the hulling-chamber.

The operation of the machine is as follows: The material is fed into the hulling-chamber 1, and is first acted upon by huller-cylinder 3. The seed-cotton is caught by the teeth of the saws 4, and by them carried upward outside of the offset or shoulder 9 to the ginning-chamber 2, any hulls that may cling to the cotton after leaving the hulling-chamber 1 being dragged off by the lateral projections 8. In the ginning-chamber the cotton is freed from the seed, the former being carried onto the brush-cylinder 5, while the latter falls upon the tops of the ribs 6, passing downward between the outer surface of the rib and the offset 9, and falling through the cut-away portion 10. It will be seen that the offset forms a partition or dividing wall between the downwardly-passing seed and the upwardly-passing seed-cotton, whereby neither is obstructed by the other.

I disclaim invention in a cotton-gin rib formed with a flange at one side or edge, a projecting piece, and a cut-away portion in said projecting piece, whereby a single channel or offset is provided for the free escape of the seed and the width of the rib lessened.

Having thus described my invention, the following is what I claim as new therein and desire to secure by Letters Patent:

1. In a cotton-gin, a rib having a flange formed in different planes, joined by an offset or shoulder, substantially as set forth.

2. A rib for a saw-gin, having a flange or projection grooved, substantially as shown, and a cut-away portion below such flange, substantially as and for the purpose set forth.

3. In a cotton-gin, the rib 6, having cut-away portion 10 below the ginning-face, and the flange 7, having the lateral projection 8, substantially as set forth.

FERDINAND C. GAMMONS.

Witnesses:
JOSEPH TOOKER,
HOSEA KINGMAN.